(12) United States Patent
Tamura

(10) Patent No.: US 10,692,190 B2
(45) Date of Patent: Jun. 23, 2020

(54) IMAGE PROCESSING APPARATUS, IMAGE PROCESSING METHOD, AND STORAGE MEDIUM THAT PERFORM SMOOTHING PROCESSING FOR A PIXEL OF INTEREST BY USING SURROUNDING PIXELS, ONE HAVING A CONVERTED PIXEL VALUE

(71) Applicant: CANON KABUSHIKI KAISHA, Tokyo (JP)

(72) Inventor: Hirokazu Tamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/057,945

(22) Filed: Aug. 8, 2018

(65) Prior Publication Data

US 2019/0050967 A1 Feb. 14, 2019

(30) Foreign Application Priority Data

Aug. 14, 2017 (JP) ................. 2017-156528

(51) Int. Cl.
| | |
|---|---|
| *G06T 5/00* | (2006.01) |
| *H04N 1/58* | (2006.01) |
| *G06T 5/20* | (2006.01) |
| *H04N 1/409* | (2006.01) |
| *H04N 1/60* | (2006.01) |

(52) U.S. Cl.
CPC ............... *G06T 5/002* (2013.01); *G06T 5/20* (2013.01); *H04N 1/409* (2013.01); *H04N 1/58* (2013.01); *G06T 2207/10008* (2013.01); *G06T 2207/10024* (2013.01); *H04N 1/6016* (2013.01)

(58) Field of Classification Search
CPC . G06T 5/002; G06T 5/20; G06T 2207/20192; G06T 2207/10024; H04N 1/409; H04N 1/58
See application file for complete search history.

(56) References Cited

U.S. PATENT DOCUMENTS

| | | |
|---|---|---|
| 6,263,100 B1 | 7/2001 | Oshino et al. |
| 6,628,820 B2 | 9/2003 | Oshino et al. |
| 8,335,391 B2 | 12/2012 | Watarai |
| 8,379,274 B2 | 2/2013 | Tamura |

(Continued)

FOREIGN PATENT DOCUMENTS

JP 2008-124976 A 5/2008

*Primary Examiner* — Ross Varndell
(74) *Attorney, Agent, or Firm* — Venable LLP

(57) ABSTRACT

An image processing apparatus includes a memory device and at least one processor to calculate, in a pixel block including a pixel of interest and a plurality of surrounding pixels, an absolute value of a difference in pixel value between the pixel of interest and a surrounding pixel, the calculating being performed for each of the surrounding pixels, to convert a pixel value of the surrounding pixel in accordance with the calculated absolute value, the converting being performed for each of the plurality of surrounding pixels, and to perform smoothing processing for the pixel of interest by using the plurality of surrounding pixels including the surrounding pixel whose pixel value is converted. The converting performs a combination of a pixel value of the pixel of interest and the pixel value of the surrounding pixel, so that as the calculated absolute value increases, a weight of the pixel of interest increases.

13 Claims, 7 Drawing Sheets

(56) References Cited

U.S. PATENT DOCUMENTS

| | | | |
|---|---|---|---|
| 8,593,694 B2 | 11/2013 | Tamura | |
| 9,383,706 B2 | 7/2016 | Tamura | |
| 2002/0118019 A1* | 8/2002 | Nomura | G06T 5/20 |
| | | | 324/509 |
| 2008/0144960 A1* | 6/2008 | Watarai | H04N 5/21 |
| | | | 382/260 |
| 2009/0123085 A1* | 5/2009 | Yoshimura | G06T 5/008 |
| | | | 382/264 |
| 2009/0226085 A1* | 9/2009 | Shiraishi | H04N 1/58 |
| | | | 382/167 |
| 2013/0135700 A1 | 5/2013 | Tamura | |
| 2015/0312442 A1* | 10/2015 | Higashi | H04N 1/409 |
| | | | 382/266 |

* cited by examiner

| pix(0,0) | pix(1,0) | pix(2,0) | pix(3,0) | pix(4,0) |
|---|---|---|---|---|
| pix(0,1) | pix(1,1) | pix(2,1) | pix(3,1) | pix(4,1) |
| pix(0,2) | pix(1,2) | pix(2,2) | pix(3,2) | pix(4,2) |
| pix(0,3) | pix(1,3) | pix(2,3) | pix(3,3) | pix(4,3) |
| pix(0,4) | pix(1,4) | pix(2,4) | pix(3,4) | pix(4,4) |

FIG.4A

| dif(0,0) | dif(1,0) | dif(2,0) | dif(3,0) | dif(4,0) |
|---|---|---|---|---|
| dif(0,1) | dif(1,1) | dif(2,1) | dif(3,1) | dif(4,1) |
| dif(0,2) | dif(1,2) |  | dif(3,2) | dif(4,2) |
| dif(0,3) | dif(1,3) | dif(2,3) | dif(3,3) | dif(4,3) |
| dif(0,4) | dif(1,4) | dif(2,4) | dif(3,4) | dif(4,4) |

FIG.4B

| pix'(0,0) | pix'(1,0) | pix'(2,0) | pix'(3,0) | pix'(4,0) |
|---|---|---|---|---|
| pix'(0,1) | pix'(1,1) | pix'(2,1) | pix'(3,1) | pix'(4,1) |
| pix'(0,2) | pix'(1,2) | pix'(2,2) | pix'(3,2) | pix'(4,2) |
| pix'(0,3) | pix'(1,3) | pix'(2,3) | pix'(3,3) | pix'(4,3) |
| pix'(0,4) | pix'(1,4) | pix'(2,4) | pix'(3,4) | pix'(4,4) |

FIG.4C

| fil(0,0) | fil(1,0) | fil(2,0) | fil(3,0) | fil(4,0) |
|---|---|---|---|---|
| fil(0,1) | fil(1,1) | fil(2,1) | fil(3,1) | fil(4,1) |
| fil(0,2) | fil(1,2) | fil(2,2) | fil(3,2) | fil(4,2) |
| fil(0,3) | fil(1,3) | fil(2,3) | fil(3,3) | fil(4,3) |
| fil(0,4) | fil(1,4) | fil(2,4) | fil(3,4) | fil(4,4) |

IMAGE PROCESSING APPARATUS, IMAGE PROCESSING METHOD, AND STORAGE MEDIUM THAT PERFORM SMOOTHING PROCESSING FOR A PIXEL OF INTEREST BY USING SURROUNDING PIXELS, ONE HAVING A CONVERTED PIXEL VALUE

BACKGROUND OF THE INVENTION

This application claims the benefit of Japanese Patent Application No. 2017-156528 filed Aug. 14, 2017, which is hereby incorporated by reference wherein in its entirety.

FIELD OF THE INVENTION

The present invention relates to an image processing apparatus that performs noise reduction processing, an image processing method, and a storage medium.

DESCRIPTION OF THE RELATED ART

Conventionally, as noise reduction processing to reduce random noise included in an image, smoothing processing using a spatial filter is known. In the smoothing processing, the product-sum operation of the pixel values of an N×N area within an image and a weight table of the N×N area (that is, a spatial filter) is performed. By using a weight table of a Gaussian distribution or averaging as the weight table, the pixel value of a pixel of interest is corrected to a weighted average value of the pixel values of pixels within the area and random noise mixed in the image is smoothed, and noise is reduced.

In a case when the above-described weight table of a Gaussian distribution or averaging is used, a problem occurs such that the edge of an image blurs and details of the image are lost, but, as noise reduction processing that takes this problem into consideration, there is processing using a bilateral filer or an ε (epsilon) filter. In the smoothing processing using these filters, smoothing is performed while maintaining edges by taking into consideration the similarity between the pixel value of the pixel of interest and each pixel value within the N×N area and changing the effect of the filter in accordance with the difference between the pixel value of the pixel of interest and each pixel value within the N×N area.

For example, in a case when the above-described bilateral filter is used, the smoothing processing is performed after correcting the weight table by multiplying the weight table of the spatial filter by a weight in accordance with the difference between the pixel value of the pixel of interest and the pixel value within the N×N area. By doing so, random noise is reduced while maintaining edges by reducing the weight of the pixel whose difference from the pixel of interest is great and increasing the weight of the pixel whose difference from the pixel of interest is small.

Similarly, in a case when the above-described ε filter is used, random noise is reduced while maintaining edges by calculating the difference between the pixel value of the pixel of interest and each pixel value within the N×N area and excluding the pixel whose difference is greater than or equal to a constant c from the target of the weight table of the spatial filter.

Further, a technique has also been disclosed that focuses attention on the fact that the standard deviation of noise increases as the pixel value of the pixel of interest becomes great, and suppresses overcorrection and insufficient correction by changing the constant c in the filter in accordance with the pixel value (see Japanese Patent Laid-Open No. 2008-124976).

However, the smoothing processing that uses the filters as described above also has problems.

In a case when the bilateral filter is used, the processing becomes complicated and, in particular, in a situation in which real-time properties are required, there is a concern that favorable performance cannot be obtained. Specifically, in the case when the bilateral filter is used, the weight table of the spatial filter is changed dynamically for each pixel, and, therefore, the divisor at the time of finding a weighted average changes dynamically depending on the pixel and, in particular, in the case when a hardware circuit is mounted, the circuit becomes complicated. That is, the operation cost is raised.

Further, in the case when the ε filter is used, all the pixels whose difference in pixel value from the pixel of interest is within the range of the constant c are smoothed, and, therefore, small-amplitude texture located within the range is also smoothed. Furthermore, the texture in a range that exceeds the constant c even a little is excluded from the target of smoothing, and, therefore, non-continuity in image quality occurs. This is also the same in the case when the constant c is changed in accordance with the pixel value as in Japanese Patent Laid-Open No. 2008-124976.

The present invention has been made in view of those problems and an object thereof is to implement smoothing processing that reduces random noise of an image while maintaining edges and small-amplitude texture at a low operation cost.

SUMMARY OF THE INVENTION

An image processing apparatus according to one embodiment of the present invention includes a memory device that stores a set of instructions, and at least one processor that executes the set of instructions to calculate, in a pixel block including a pixel of interest and a plurality of surrounding pixels, an absolute value of a difference in pixel value between the pixel of interest and each surrounding pixel, to calculate a weighted average of pixel values of the pixel of interest and each surrounding pixel in accordance with the calculated absolute value, and to perform smoothing processing for a pixel value calculated by the weighted average.

Further features of the present invention will become apparent from the following description of exemplary embodiments with reference to the attached drawings.

BRIEF DESCRIPTION OF THE DRAWINGS

FIG. 4A to FIG. 4D are diagrams each showing a pixel of interest and surrounding pixels thereof of a window according to one embodiment of the present invention;

FIG. 5A and FIG. 5B are diagrams each showing processing results of a pixel of interest and surrounding pixels thereof of a window according to one embodiment of the present invention;

DESCRIPTION OF THE EMBODIMENTS

In the following, embodiments for embodying the present invention are explained in detail by using the drawings. The same symbol in a plurality of drawings indicates the same thing.

First Embodiment

[Configuration of Image Forming Apparatus]

Figure 1:
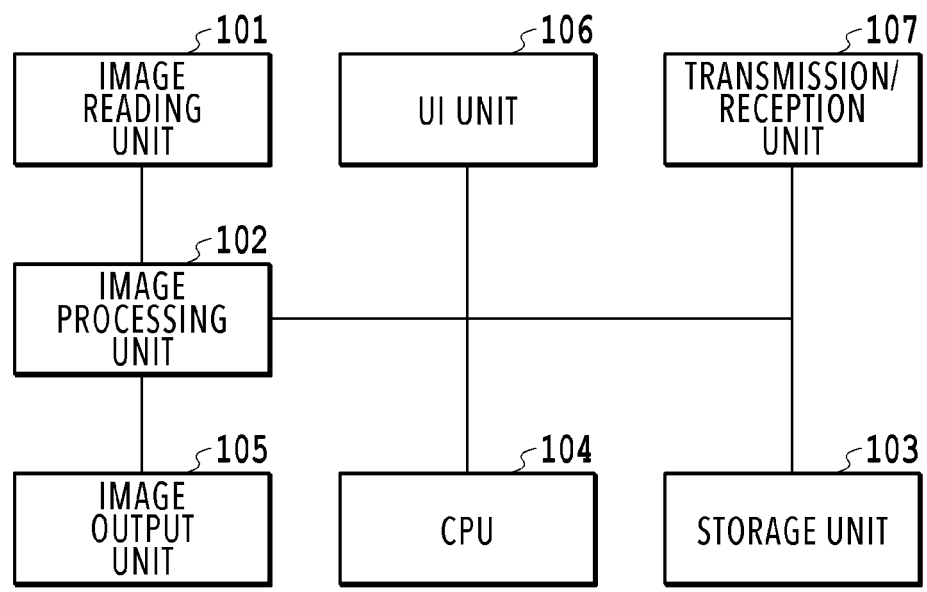
FIG. 1 is a block diagram showing an overview configuration of an image forming apparatus according to one embodiment of the present invention.

FIG. 1 is a block diagram showing a configuration of an image forming apparatus in a first embodiment.

As shown in FIG. 1, the image forming apparatus includes an image reading unit 101, an image processing unit 102, a storage unit 103, a CPU 104, an image output unit 105, a UI (User Interface) unit 106, and a transmission/reception unit 107. It is possible for the image forming apparatus to connect to a server that manages image data, a personal computer (PC) that gives instructions to perform printing, and so on, via a network, and the like.

The image reading unit 101 reads an image of a document and outputs image data.

The image processing unit 102 converts print information including image data output from the image reading unit 101 and image data input from the outside, such as the transmission/reception unit 107, into intermediate information (hereafter, called an object) and stores the object in an object buffer of the storage unit 103. At the time of this storage, irreversible compression processing, such as JPEG, is performed for those in which image data is included. Further, the image processing unit 102 generates bitmap data based on a buffered object and stores the bitmap data in the storage unit 103. At this time, color conversion processing, noise reduction processing, and so on, are performed. Details will be described later.

The storage unit 103 includes a ROM, a RAM, a hard disk (HD), and so on. The ROM stores various control programs and image processing programs executed by the CPU 104. The RAM is used as a reference area and a work area in which the CPU 104 stores data and various kinds of information. Further, the RAM and HD are used for storing the above-described object buffer, and the like. Furthermore, processing parameters necessary for image processing are also stored.

Image data is accumulated on the RAM and HD, pages are sorted, documents having a plurality of sorted pages are accumulated, and a plurality of copies is printed.

The image output unit 105 forms and outputs a color image onto a printing medium, such as a printing sheet.

The UI unit 106 performs an operation to give instructions as to the kind of image processing in the image processing unit 102 and instructions to adjust the level thereof to the apparatus. For example, the UI unit 106 performs the setting of the amount of adjustment of the noise reduction processing described previously, and the like.

The transmission/reception unit 107 receives image data for print from outside of the image forming apparatus, and saves the image data in the storage unit 103 and outputs the image data to the image output unit 105. Further, the transmission/reception unit 107 transmits image data accumulated within the storage unit 103 to the outside of the image forming apparatus.

[Overview of Apparatus]

Figure 2:
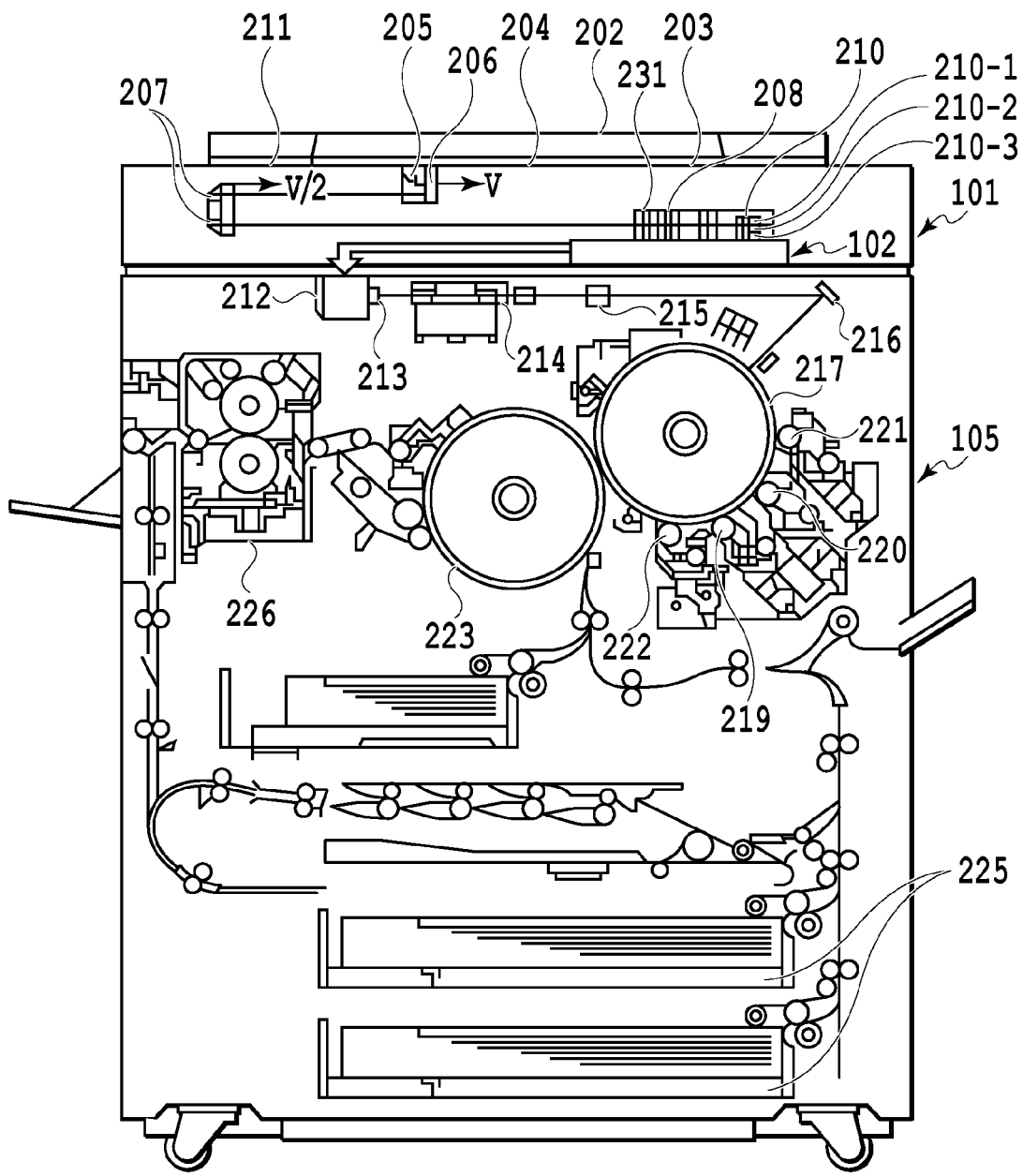
FIG. 2 is an overview diagram of an image forming apparatus according to one embodiment of the present invention.

FIG. 2 is an overview diagram of the image forming apparatus in the present embodiment.

In the image reading unit 101, between a document table glass 203 and a document pressing plate 202, a document 204, from which an image is read, is placed and the document 204 is irradiated with light of a lamp 205. The reflected light from the document 204 is guided to mirrors 206 and 207, and an image is formed on a three-line sensor 210 by a lens 208. The lens 208 is provided with an infrared cut filter 231. By a motor (not shown schematically), a mirror unit including the mirror 206 and the lamp 205 is moved at a velocity of V in the direction of the arrow and a mirror unit, including the mirror 207, is moved at a velocity of V/2 in the direction of the arrow. That is, the mirror unit moves in the direction (sub scanning direction) perpendicular to the electrical scanning direction (main scanning direction) of the three-line sensor 210 and the entire surface of the document 204 is scanned.

The three-line sensor 210 including CCDs of three lines performs color separation of light information that is input, reads each color component of red R, green G, and blue B of full-color information, and sends the color component signal to the image processing unit 102. Each of the CCDs making up the three-line sensor 210 has light receiving elements corresponding to 5,000 pixels and is capable of reading a document of A3 size, which is the maximum size that can be loaded on the document table glass 203, in the direction of the short side (297 mm) with a resolution of 600 dpi.

A standard white board 211 is provided for correcting data read by each of CCDs 210-1 to 210-3 of the three-line sensor 210. The standard white board 211 is a white color exhibiting substantially uniform reflection characteristics for visual light.

The image processing unit 102 electrically processes an image signal that is input from the three-line sensor 210 or the transmission/reception unit 107, and, after performing image processing, such as noise removal, of an image, generates each color component signal of cyan C, magenta M, yellow Y, and black K. The image processing unit 102 sends the generated color component signals of CMYK to the image output unit 105. The image that is output at this time is an image of CMYK for which halftone processing, such as dither, has been performed.

In the image output unit 105, the image signal of C, M, Y, or K that is sent from the image reading unit 101 is sent to a laser driver 212. The laser driver 212 performs modulation drive for a semiconductor laser element 213 in accordance with the input image signal. A laser beam output from the semiconductor laser element 213 scans a photoconductor drum 217 via a polygon mirror 214, an f-O mirror 215, and a mirror 216, and forms an electrostatic latent image on the photoconductor drum 217.

A development counter includes a magenta development counter 219, a cyan development counter 220, a yellow development counter 221, and a black development counter 222. By the four development counters coming into contact with the photoconductor drum 217 by turns, the electrostatic latent image formed on the photoconductor drum 217 is developed by toner in the corresponding color, and a toner image is formed. A printing sheet supplied from a printing sheet cassette 225 is wound around a transfer drum 223 and the toner image on the photoconductor drum 217 is transferred onto the printing sheet.

The printing sheet onto which the toner images in four colors of C, M, Y, and K are transferred sequentially passes through a fixing unit 226, and, thereby, the toner image is fixed and, then, the printing sheet is discharged to the outside of the apparatus.

In FIG. 2, the electrophotographic image forming apparatus in which a toner image is formed on the photoconductor drum and the toner image is transferred onto a printing sheet is shown, but it is also possible to apply the present invention to an image forming apparatus adopting another scheme, such as an ink jet scheme.

[Noise Reduction Processing]

Figure 3:
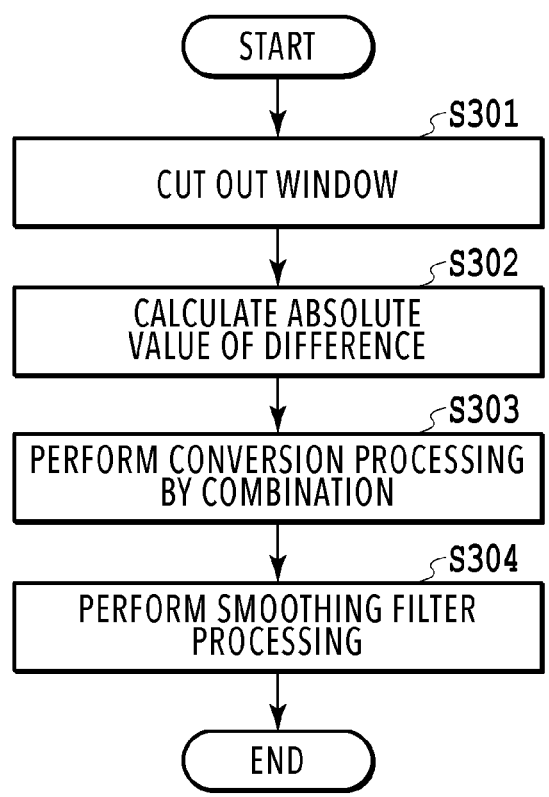
FIG. 3 is a flowchart of noise reduction processing according to one embodiment of the present invention.

Next, with reference to the flowchart shown in FIG. 3, noise reduction processing of an image in the image processing unit 102 is explained in detail. The processing shown in the flowchart is performed by the image processing unit 102 based on a command from the CPU 104. That is, the image processing unit 102 functions as an image processing apparatus. Further, the processing flow in FIG. 3 shows an image processing method.

It is assumed that the input image is, as an example, an RGB image including three colors, that is, red, green, and blue, including random noise components. That is, the input image has a plurality of channels. There is a case when, in image data that is input from the outside by the image reading unit 101, the transmission/reception unit 107, and so on, random noise is included. Further, there is a case when irreversible compression, such as JPEG, is used also for buffering for the storage unit 103, and noise resulting from this may be overlapped. In explanation of the present embodiment, it is supposed that the RGB image such as this is input. Each signal value of the RGB image may take a value between 0 and 255 in the case of an 8-bit signal. In the following explanation, this signal value is called a pixel value. The processing explained here is performed independently for each of the three signals of RGB, but here, for simplification of explanation, a specific one color, for example, red is explained as an example.

First, at step S301, the image processing unit 102 cuts out a window having a predetermined size for a red signal. In the present embodiment, it is assumed that the window having a predetermined size is a window of 5×5 pixels. Further, a window is a pixel block including a pixel of interest and a plurality of surrounding pixels.

Next, at step S302, the image processing unit 102 calculates the absolute value of a difference from the pixel of interest for the pixel value of each pixel of the cut-out window. That is, the image processing unit 102 functions as an absolute value calculation unit. Hereafter, the processing at step S302 is also called difference calculation processing.

Here, by using FIG. 4A and FIG. 4B, the difference calculation processing is explained. In FIG. 4A, pix (x, y) indicates a pixel value at each of coordinates within the window cut out at step S301. Here, pix (2, 2) is the pixel value of the pixel of interest located at the center of the window. The image processing unit 102 calculates the absolute value of the difference between pix (0, 0) and pix (2, 2) and outputs the absolute value as dif (0, 0). This processing is performed for all of the surrounding pixels, except for the pixel of interest and the absolute value diff (x, y) of the difference in pixel value from the pixel of interest at each pixel is found. The found results are shown in FIG. 4B. The absolute value of the difference in pixel value may take a value between 0 and 255 in the case when the pixel value is an 8-bit signal, but, in the present embodiment, normalization and clipping processing are performed for the absolute value and the range of the value is reduced to 0 to 16. Specifically, by using expression (1) below, the absolute value of the difference in pixel value is calculated and normalization processing and clipping processing are performed.

$$dif(x, y) = \frac{|pix(x, y) - pix(2, 2)|}{8} \quad (1)$$

if $(dif(x, y) > 16)$ then $dif(x, y) = 16$.

Here, expression (1) indicates an example in which the absolute value of the difference in pixel value is divided by a divisor of 8. By dividing the difference that may take 255 at the maximum by the divisor 8, the range of the value that dif (x, y) may take is normalized to a range between 0 and 31. The divisor 8 is also called a normalization value. Further, clipping processing is performed and all of the values between 17 and 31 of the values are rounded off to 16. That is, the clipping threshold value is 16. That is, this divisor determines the range of the difference that is clipped as a parameter together with normalization. By changing the value of the divisor (that is, normalization value), it is possible to adjust the amount of noise reduction. Further, by using a value that is a power of 2 (8 in this example) as the divisor, division is replaced with bit shift and the operation cost (in the case of a hardware circuit, a divider) is suppressed. It may also be possible not to perform the normalization processing and the clipping processing.

Next, at step S303, the image processing unit 102 performs combination processing (weighted average) by linear combination of the value of pix (x, y) and the pixel value pix (2, 2) of the pixel of interest by using the calculated values of dif (x, y) and converts the pixel value of each pixel within the window. That is, the image processing unit 102 functions as a weighted average calculation unit configured to calculate a weighted average of the pixel values of the pixel of interest and each surrounding pixel. It is possible to calculate a pixel value pix' (x, y) after conversion from pix (x, y), pix (2, 2), and dif (x, y) by using expression (2) below.

$$pix'(x, y) = \frac{pix(2, 2) \times dif(x, y) + pix(x, y) \times (16 - dif(x, y))}{16} \quad (2)$$

In expression (2), in the pixel whose diff (x, y) is large, that is, whose difference from the pixel of interest is large, the weight of the pixel of interest indicated by pix (2, 2) becomes large. Conversely, in the pixel whose pix (x, y) is small, that is, whose difference from the pixel of interest is small, the weight of the pixel of interest indicated by pix (2, 2) becomes small. Then, pix' (x, y) thus found is replaced with a pixel value whose value is comparatively close to pix (2, 2). Further, from expression (2) also, for pix' (2, 2) in the case when pix (x, y) becomes the pixel of interest, the calculation results become pix (2, 2) without exception, and therefore, pix' (2, 2)=pix (2, 2) holds. The results are shown in FIG. 4C.

In this processing, to the pixel whose difference from the pixel of interest is large, the weight of the pixel of interest is applied more, and, therefore, at the edge portion of an image, the degree of influence of the opposite color of the pixel of interest on the processing is reduced. As a result of this, the edge component of pix' (x, y) becomes small.

Figures 5A, 5B:
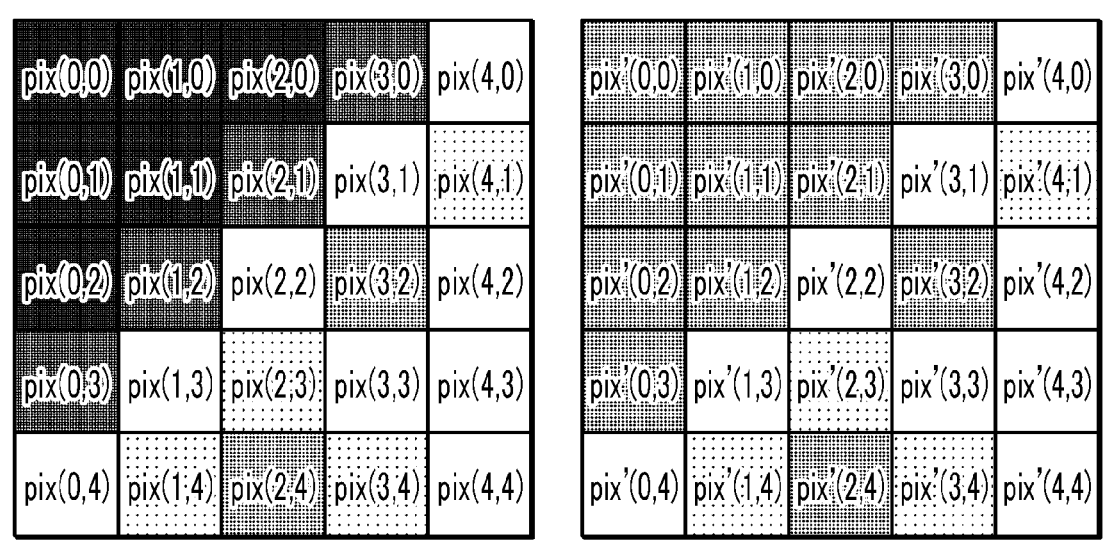

FIG. 5A and FIG. 5B show specific examples of the change in pixel value by the conversion processing. FIG. 5A shows an example of a window in which a black edge is formed on a white background and a blacker pixel has a lower pixel value and a whiter pixel has a higher pixel value. The whitest pixel has the maximum pixel value. In the window in which the black edge is formed on the white background as in FIG. 5A, in the case when the pixel of interest is located on the white background side, the pixel value on the black edge side, which is the opposite color, becomes unlikely to affect the processing. Specifically, in FIG. 5A, the pixel value pix (x, y) before conversion is shown and, in FIG. 5B, the pixel value pix' (x, y) after conversion is shown. The pixel of interest pix (2, 2) is located at the end portion on the white background side. By this conversion processing, it is possible to remove the influence of the black edge side from the window in the pixel value pix' (x, y) after conversion and, ideally, the window is converted into a window including only small-amplitude random noise.

Further, by using a value (in this example, 16), which is a power of 2, as the divisor in expression (2), division is replaced with bit shift and the operation cost (in the case of a hardware circuit, a divider) is suppressed. This is made possible because dif (x, y) is normalized by 8 for the absolute value of the difference from the pixel of interest obtained at previous step S302 and clipped by 16.

Next, at step S304, the image processing unit 102 performs the convolution operation of a smoothing filter for the pixel value pix' (x, y) after conversion. Hereafter, the processing at step S304 is also called filter operation processing. Here, as shown in expression (3) below, the value of the weight coefficient fil (x, y) of the filter shown in FIG. 4D and the value of the pix' (x, y) in FIG. 4C are multiplied, and this multiplication is performed for all of the pixels making up the window, and the output out is determined by adding up all the products of the multiplication. As the value of the weight coefficient fil (x, y) of the filter, one that is stored in the storage unit 103 is read and used.

$$\text{out} = \frac{\Sigma_x \Sigma_y (\text{fil}(x, y) \times \text{pix}'(x, y))}{256} \quad (3)$$

As a specific example of the weight coefficients fil (x, y) of the filter, weight coefficients of a Gaussian distribution as follows are used.

| 1 | 4 | 6 | 4 | 1 | |
|---|---|---|---|---|---|
| 4 | 16 | 24 | 16 | 4 | |
| 6 | 24 | 36 | 24 | 6 | |
| 4 | 16 | 24 | 16 | 4 | |
| 1 | 4 | 6 | 4 | 1 | /256 |

The total number of weight coefficients of this filter is also 256, which is a value of a power of 2. Consequently, similar to the previous combination processing, it is possible to use bit shift as the division of expression (3), and, therefore, it is possible to suppress the operation cost of division (in the case of a hardware circuit, a divider).

Further, the weight coefficients of this filer have vertical and horizontal symmetric properties. That is, the same value is used repeatedly, and, therefore, it is not necessary to perform multiplication for all of the 25 pixels making up the window and it is possible to reduce the number of times of multiplication by changing the order of calculation. Specifically, fil (0, 0)=fil (4, 0)=fil (0, 4)=fil (4, 4), and, therefore, the other pixels that are multiplied by the same weight coefficient as that of pix' (0, 0) are pix' (4, 0), pix' (0, 4), and pix' (4, 4). Because of this, at the time of multiplying the weight coefficient fil (0, 0), it is possible to transform expression (4) below into expression (5).

$$\text{pix}'(0,0) \times \text{fil}(0,0) + \text{pix}'(4,0) \times \text{fil}(4,0) + \text{pix}'(0,4) \times \text{fil}(0,4) + \text{pix}'(4,4) \times \text{fil}(4,4) \quad (4)$$

$$(\text{pix}'(0,0) + \text{pix}'(4,0) + \text{pix}'(0,4) + \text{pix}'(4,4)) \times \text{fil}(0,0) \quad (5)$$

Consequently, it is made possible to reduce the number of times of multiplication to ¼, and, therefore, it is made possible to suppress the operation cost (in the case of a hardware circuit, multiplier). It is possible to integrate all the weight coefficients of this filter into six kinds below.

fil (0, 0)=fil (4, 0)=fil (0, 4)=fil (4, 4)
fil (1, 0)=fil (3, 0)=fil (0, 1)=fil (4, 1)=fil (0, 3)=fil (4, 3)=fil (1, 4)=fil (3, 4)
fil (2, 0)=fil (0, 2)=fil (4, 2)=fil (2, 4)
fil (1, 1)=fil (3, 1)=fil (1, 3)=fil (3, 3)
fil (2, 1)=fil (1, 2)=fil (3, 2)=fil (2, 3)
fil (2, 2)

These six kinds of weight coefficient are the weight coefficients at the portion shown by gray hatching in FIG. 4D and it is possible to transform expression (3) described above into expression (6) below.

$$\begin{aligned}\text{out}=(&\text{fil}(0,0)\times(\text{pix}'(0,0)+\text{pix}'(4,0)+\text{pix}'(0,4)+\text{pix}'(4,4))+\text{fil}(1,0)\times(\text{pix}'(1,0)+\text{pix}'(3,0)+\text{pix}'(0,1)+\text{pix}'(4,1)+\text{pix}'(0,3)+\text{pix}'(4,3)+\text{pix}'(1,4)+\text{pix}'(3,4))+\text{fil}(2,0)\times(\text{pix}'(2,0)+\text{pix}'(0,2)+\text{pix}'(4,2)+\text{pix}'(2,4))+\text{fil}(1,1)\times(\text{pix}'(1,1)+\text{pix}'(3,1)+\text{pix}'(1,3)+\text{pix}'(3,3))+\text{fil}(2,1)\times(\text{pix}'(2,1)+\text{pix}'(1,2)+\text{pix}'(3,2)+\text{pix}'(2,3))+\text{fil}(2,2)\times(\text{pix}'(2,2)))/256\end{aligned} \quad (6)$$

It is also made possible to reduce the number of times of multiplication from 25 corresponding to the total number of pixels shown in expression (3) to six shown in expression (6). This is transformation of an operation that can be performed as long as the weight coefficients of the filter have vertical and horizontal symmetric properties and the weight coefficients of a general filter have such symmetric properties.

By applying this flow to all of the pixels making up an image and further performing for all the signals of red, green, and blue, the reduction processing of random noise included in an image is implemented while maintaining edge components and small-amplitude texture.

Figure 6:
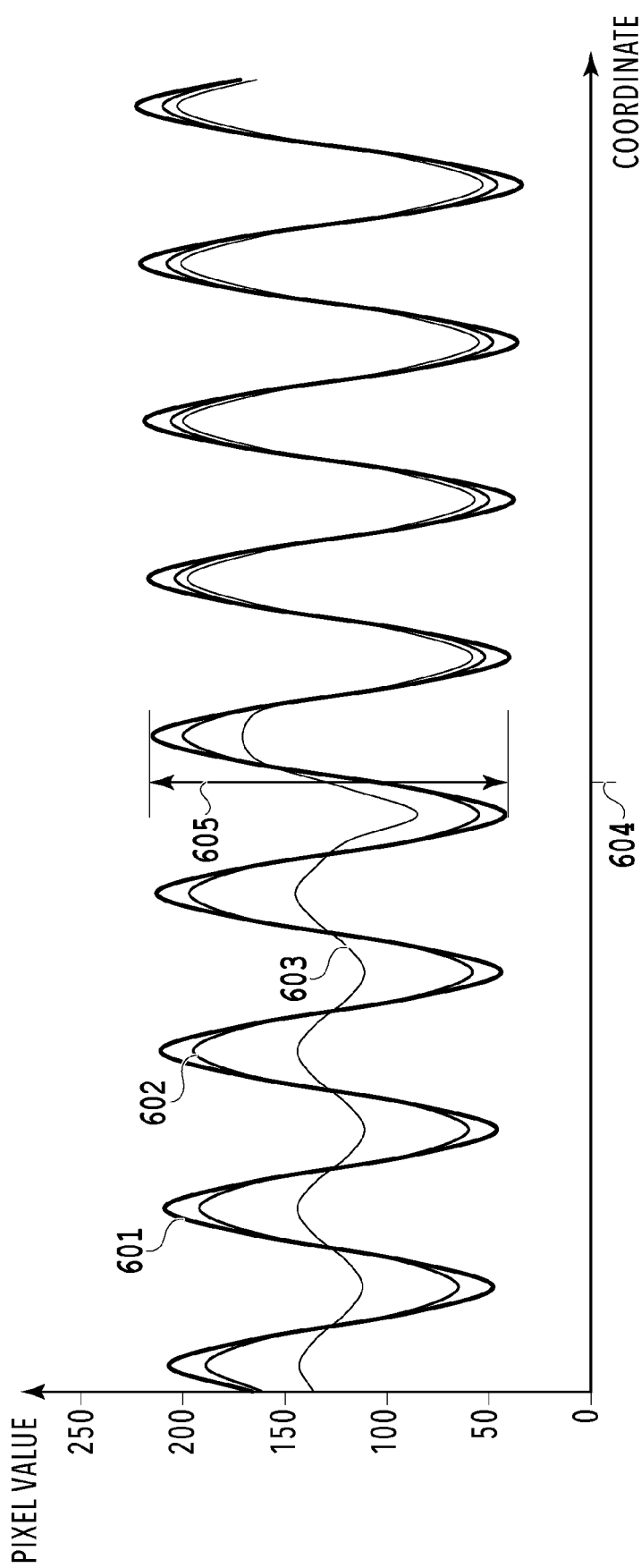
FIG. 6 is a diagram showing a comparison of signal changes of noise reduction processing results according to one embodiment of the present invention.

FIG. 6 shows a comparison of signal changes of noise reduction processing results in the present embodiment. FIG. 6 shows the way the signal of an image changes, representing a section diagram of the pixel value. The horizontal axis represents the coordinate of an image and the vertical axis represents the pixel value. An input signal 601 changes into a wave whose pixel value amplitude becomes gradually larger toward the rightward direction in FIG. 6. In results 603 of processing in which the representative c filter is applied, an amplitude 605 exceeds the threshold value c in the c filter from a coordinate position 604 as a boundary, and the waveform changes largely and is noncontinuous as a signal. That is, the signal is smoothed largely until the coordinate position 604 is reached and after the coordinate position 604, the effect of the smoothing is reduced. In contrast to this, in results 602 of the processing in the present embodiment, the signal change becomes gradual continuously while maintaining the effect of noise reduction.

In the present embodiment, the example is explained in which the above-described processing is performed for all of the three signals of red, green and blue, and an RGB image, in which noise is reduced, is generated, but, for more simplification, it may also be possible to make a configuration in which color space conversion processing is performed before and after the processing in FIG. 3.

First, the image processing unit 102 converts each signal of an RGB image into a luminance/chrominance based color space, here, the YCbCr color space by using expression (7) below as preprocessing. That is, the image processing unit 102 functions as a color space conversion unit.

$$\left.\begin{array}{l} Y = 0.2990 \times R + 0.5870 \times G + 0.1140 \times B \\ Cb = -0.1687 \times R - 0.3313 \times G + 0.5000 \times B \\ Cr = 0.5000 \times R - 0.4187 \times G - 0.0813 \times B \end{array}\right\} \quad (7)$$

Next, the image processing unit 102 performs the noise reduction processing explained in the previous flow for the luminance signal Y and performs inverse color space conversion processing as postprocessing, and returns the YCbCr signal into the RGB image. That is, the image processing unit 102 functions as an inverse color space conversion unit. In the case when the luminance signal after the processing is taken to be Y', it is possible to find each signal of R', G', and B' of the RGB image after the noise reduction processing by expression (8) below by using the Cb/Cr signals found in the preprocessing.

$$\left.\begin{array}{l} R' = Y' + 1.4020 \times Cr \\ G' = Y' - 0.3441 \times Cb - 0.7141 \times Cr \\ B' = Y' + 1.7720 \times Cb \end{array}\right\} \quad (8)$$

Further, for the color space conversion processing, the YCbCr color space is used here, but another color space, such as Lab, may be used as long as the color space is a luminance/chrominance based color space.

Furthermore, it is possible to perform the same processing for a CMYK image represented in cyan, magenta, yellow, and black.

Still furthermore, in the filter operation in the present embodiment, the example is explained in which the weight coefficients can be integrated into the six kinds, but the example is not limited to this. That is, even in the case of the above-described weight coefficients, six times of multiplication are necessary, and, therefore, for more simplification, it may also be possible to use a weight table of averaging that uses a filter whose all the values of the weight coefficients are 1/25, that is, that uses an average value of pix' (x, y) of 25 pixels. Further, it is also possible to perform a mask operation (for example, median filter) that removes noise for pix' (x, y), and the like, not limited to the convolution by the filter operation.

Furthermore, in the present embodiment, the size of a window is taken to be a size of 5×5 pixels, but the size is not limited thereto.

Second Embodiment

In the first embodiment described above, the noise reduction processing is performed by using parameters, such as weight coefficients of a filter and a normalization value, determined in advance, and, therefore, the amount of reduction of noise is also determined in advance. However, depending on the attribute of an input image, the amount of noise is different. For example, the amount of noise is different between an image of a digital camera, in which there are many noise components, and a character image or a graphics image drawn by vector drawing. Further, in the case when it is possible to switch the level of noise reduction (that is, amount of noise reduction) in accordance with preferences of a user, not only the attribute of an input image, the degree of freedom of the noise reduction processing increases.

Consequently, in the present embodiment, a configuration is explained in which it is made possible to switch the level of noise reduction by switching weight coefficients of a filter and correction values (that is, parameters) in accordance with a setting value set by a user. Explanation of the configuration of the image forming apparatus, the overview of the apparatus, and the duplicated processing flow, which are the same as those of the first embodiment, is omitted, and, in the following, difference calculation processing at step S302 and filter operation processing at step S304, which are different from the first embodiment, are explained.

Figure 7:
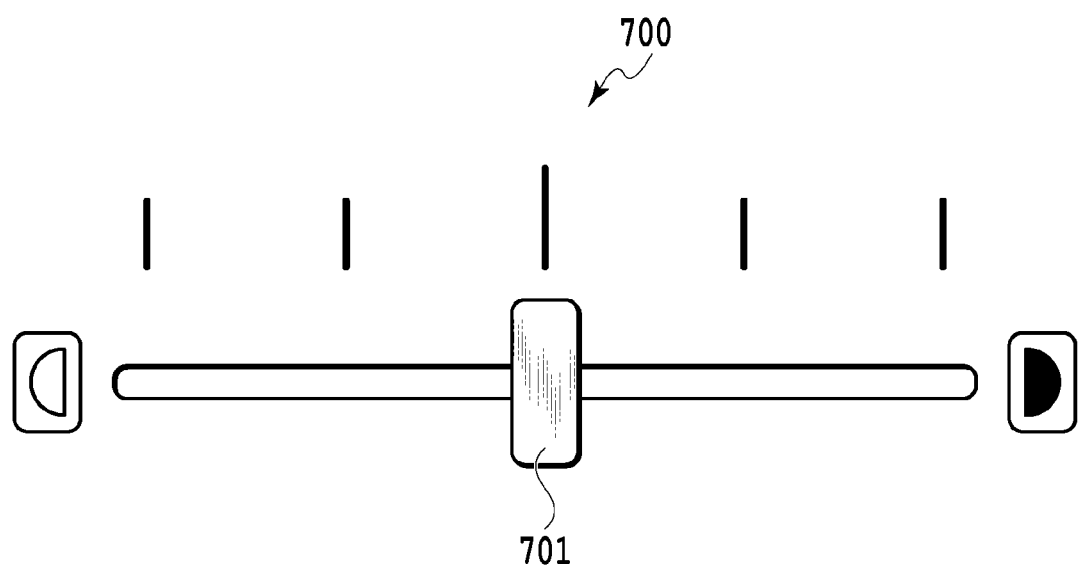
FIG. 7 is a diagram showing a UI unit according to one embodiment of the present invention.

The UI unit 106 changes the level of noise reduction in accordance with the operation performed by a user on a UI 700 as shown in FIG. 7. The UI 700 has a slide bar 701 and, in the case when a user slides the slide bar 701 to the right, it is instructed to increase the level of noise reduction and, in the case when a user slides the slide bar 701 to the left, it is instructed to reduce the level of noise reduction. It is assumed that the first embodiment described above is in the state where the slide bar 701 is located at the center of the UI 700, and, hereafter, this state is called the standard state. The setting value of the level of noise reduction set by the UI unit 106 is temporarily stored in the storage unit 103. The image processing unit 102 refers to the setting value stored in the storage unit 103 and changes the weight coefficients of a filter and the parameters used for the noise reduction processing. The setting value set by the UI unit 106 becomes smaller as the slide bar 701 moves to the left from the standard state and becomes larger as the slide bar 701 moves to the right. The UI 700 shown in FIG. 7 has an adjustment width between −2 and +2.

In the present embodiment, the degree of noise reduction (that is, the level of noise reduction) is changed by changing the divisor at the time of calculating a difference used at step S302 and the weight coefficients of a smoothing filter used at step S304. The image processing unit 102 changes these parameters in accordance with the setting value of the level of noise reduction set by the UI unit 106 and stored in the storage unit 103.

First, a change from the standard state of the parameter in the difference calculation processing at step S302 is explained. In the case of reducing the effect of noise reduction, the image processing unit 102 changes the divisor (that is, the normalization value) in expression (1) at step S302 from 8 in the standard state shown in the first embodiment to a value smaller than 8. For example, as shown in expression (9) below, the divisor is changed to 4.

$$dif(x, y) = \frac{|pix(x, y) - pix(2, 2)|}{4} \quad (9)$$

By doing so, the value that dif (x, y) may take becomes larger and the weight of the pixel of interest pix (2, 2) becomes large at the time of performing the combination processing at step S303 and converting the pixel value of the window, and the amount of replacement of the pixel of interest at the time of calculation of pix' (x, y) becomes large. That is, the influence of pix (x, y) of the surrounding pixel becomes small, and, therefore, the amount of noise reduction becomes small and the effect of noise reduction is reduced.

On the other hand, in the case of increasing the effect of noise reduction, the image processing unit 102 changes the divisor in expression (1) at step S302 from 8 in the standard state to a value larger than 8, for example, 16, so that part of edges and small-amplitude texture also become the target of smoothing. By doing so, the value that dif (x, y) may take becomes smaller, the weight of the pixel of interest at the time of combination processing at step S303 becomes small, and the influence of the surrounding pixel becomes large. As a result of this, the degree of smoothing becomes large and the effect of noise reduction is increased.

In the present embodiment also, by using a value of a power of 2 as the divisor, the calculation cost is suppressed.

Following the above, a change from the standard state of the weight coefficient of the smoothing filter in the filter operation processing at step S304 is explained. In the case of reducing the effect of noise reduction, the image processing unit 102 generates a weight coefficient whose degree of smoothing is reduced by the interpolation operation of the weight coefficient of the filter in the standard state used in the first embodiment and the weight coefficient of the through output in which the pixel of interest is output as it is. Specifically, a weighted average of the weight coefficient of the through output shown below and the weight coefficient in the standard state is calculated and taken to be a new weight coefficient.

The weight coefficients of the through output are shown below.

```
0  0   0  0  0
0  0   0  0  0
0  0  256 0  0
0  0   0  0  0
0  0   0  0  0  /256
```

The weight coefficients of the filter in the standard state used in the first embodiment are shown below.

```
1   4   6  4  1
4  16  24 16  4
6  24  36 24  6
4  16  24 16  4
1   4   6  4  1  /256
```

The image processing unit 102 obtains a weight coefficient below by performing a weighted operation (weighted average) with, for example, a ratio of 2:1 for the weight coefficients at the same coordinates by the above-described weight coefficient of the through output and the weight coefficient in the standard state and by rounding off the obtained value.

```
0  1   2   1  0
1  5   8   5  1
2  8  183  8  2
1  5   8   5  1
0  1   2   1  0  /251
```

The total value of the weight coefficients of the filter described above is not 256 (that is, a power of 2) because of the influence of an error in rounding off to an integer at the time of calculation, and, therefore, in this case, division is necessary for processing. Consequently, the weight of the pixel of interest is offset by an adjustment value for adjusting the total value of the weight coefficients to 256 in order to make it possible to perform the convolution operation by bit shift (in this example, an adjustment value of 5 is added to the weight 183 of the pixel of interest) and weight coefficients below are obtained.

```
0  1   2   1  0
1  5   8   5  1
2  8  188  8  2
1  5   8   5  1
0  1   2   1  0  /256
```

The weight coefficients described above are the weight coefficients whose effect of noise reduction is the lowest in the present embodiment. That is, the weight coefficients are taken to be the coefficients in the case when the slide bar 701 of the UI 700 is slid to the leftmost end. The coefficients whose effect of noise reduction is the second lowest are calculated by changing the weight of the weighted operation to 1:2, and the following weight coefficients that are made closer to the standard state of the first embodiment are obtained. The following weight coefficients are the weight coefficients after the weight of the pixel of interest is offset by an adjustment value for adjusting the total value of the weight coefficients to 256. Specifically, by subtracting an adjustment value of 5 from the weight 109 of the pixel of interest after the weighted operation, the total value of the weight coefficients is adjusted to 256.

```
1   3   4   3  1
3  11  16  11  3
4  16 104  16  4
3  11  16  11  3
1   3   4   3  1  /256
```

Next, the case when the effect of noise reduction is made the highest is explained. In this case, as the weight coefficients of the filter, the following weight coefficients closer to the average of the all the pixels and whose total value of the weight coefficients becomes 256 are used, so that the effect of smoothing becomes the highest. That is, the following weight coefficients are taken to be the weight coefficients used in the case when the slide bar 701 of the UI 700 is slid to the rightmost end.

```
10 10 10 10 10

10 10 11 10 10

10 11 12 11 10

10 10 11 10 10

10 10 10 10 10  /256
```

By using the above-described weight coefficients, smoothing applies strongly and the effect of noise reduction becomes high. The coefficients whose effect of noise reduction is the second highest are taken to be the following weight coefficients obtained by performing the weighted operation with a ratio of 1:1 for the weight coefficients in the standard state of the first embodiment and the above-described weight coefficient whose effect of noise reduction is the highest and, by offsetting the center portion by an adjustment value to adjust the total value of the weight coefficients to 256. In the following weight coefficients, the total value of the weight coefficients is adjusted to 256 by subtracting an adjustment value of 4 from the weight 24 of the pixel of interest after the weighted operation.

```
6  7   8  7  6

7  13 18 13  7

8  18 20 18  8

7  13 18 13  7

6  7   8  7  6  /256
```

By using the above-described weight coefficients, it is possible to create an intermediate state between the standard state and the state where the effect of noise reduction is the highest. It is possible for the image processing unit 102 to change the effect of noise reduction by selectively using the weight coefficients of the filter such as this in accordance with the level of noise reduction and by performing the convolution processing. As in the first embodiment, the calculated weight coefficients of the filter have vertical and horizontal symmetric properties, and, therefore, it is possible to reduce the number of times of multiplication at the time of the convolution processing to six.

As explained above, by changing the divisor at the time of calculating a difference used at step S302 and the weight coefficients of a smoothing filter used at S304, it is made possible to change the degree of noise reduction for an input image in accordance with the setting.

Further, in the present embodiment, the configuration is explained as an example in which both the divisor at the time of difference calculation and the weight coefficients of the smoothing filter are changed in accordance with the UI 700, but it is possible to change the effect of noise reduction by one of the divisor and the weight coefficients changing in an interlocking manner with the UI 700. For example, it is also possible to increase or to reduce the effect of noise reduction by changing only the divisor at the time of difference calculation while keeping the weight coefficients of the filter fixed. Further, it is also possible to increase or to reduce the effect of noise reduction by performing the smoothing processing by using the weight coefficients of the filter in accordance with the setting of a user while keeping the divisor at the time of different calculation fixed.

In the present embodiment, the example is explained in which the level of noise reduction is switched in accordance with the setting value set on the UI 700, but as described at the beginning, it may also be possible to switch the level of noise reduction in accordance with the attribute of an input image.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, it is made possible to implement smoothing processing to reduce random noise in an image while maintaining edges and small-amplitude texture at a low operation cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
(A) a memory device that stores a set of instructions; and
(B) one or more processors that execute the set of instructions:
  (i) to calculate, in a pixel block including a pixel of interest and a plurality of surrounding pixels, an absolute value of a difference in pixel value between the pixel of interest and a surrounding pixel in the plurality of pixels, wherein the calculating is performed for each of the surrounding pixels;
  (ii) to convert a pixel value of the surrounding pixel in accordance with the calculated absolute value, wherein the converting is performed for each of the plurality of surrounding pixels; and

(iii) to perform smoothing processing for the pixel of interest by using the plurality of surrounding pixels including the surrounding pixel whose pixel value is converted, wherein the converting performs a combination of a pixel value of the pixel of interest and the pixel value of the surrounding pixel, so that as the calculated absolute value increases, a weight of the pixel of interest increases.

2. The image processing apparatus according to claim 1, wherein the one or more processors execute instructions in the memory device to perform a combination of pixel values by using the calculated absolute value as the weight for the pixel of interest.

3. The image processing apparatus according to claim 2, wherein the one or more processors execute instructions in the memory device to perform a combination of pixel values so that the weight of the pixel of interest becomes large for a pixel whose calculated absolute value is large and to perform a combination of pixel values so that the weight of the pixel of interest becomes small for a pixel whose calculated absolute value is small.

4. The image processing apparatus according to claim 1, wherein the one or more processors execute instructions in the memory device to perform normalization processing and clipping processing for the calculated absolute value.

5. The image processing apparatus according to claim 1, wherein the one or more processors execute instructions in the memory device to perform, before calculating the absolute value, color space conversion into a luminance/chrominance based color space for an input image having a plurality of channels, and to perform, after the smoothing processing, inverse color space conversion by using a luminance signal in the luminance/chrominance based color space for which the smoothing processing has been performed.

6. The image processing apparatus according to claim 1, wherein the one or more processors execute instructions in the memory device to perform the smoothing processing by using weight coefficients of a Gaussian distribution or averaging.

7. The image processing apparatus according to claim 4, wherein the one or more processors execute instructions in the memory device to change a normalization value in the normalization processing in accordance with a level of noise reduction for an input image.

8. The image processing apparatus according to claim 1, wherein the one or more processors execute instructions in the memory device to change weight coefficients used for the smoothing processing in accordance with a level of noise reduction for an input image.

9. The image processing apparatus according to claim 7, wherein the one or more processors execute instructions in the memory device to set the level of noise reduction for the input image.

10. The image processing apparatus according to claim 7, wherein the level of noise reduction switches in accordance with an attribute of the input image.

11. The image processing apparatus according to claim 1, wherein a divisor of division in the absolute value calculation processing, the combination processing, or the smoothing processing is a value of a power of two.

12. An image processing method, the method comprising the steps of:
calculating, in a pixel block including a pixel of interest and a plurality of surrounding pixels, an absolute value of a difference in pixel value between the pixel of interest and a surrounding pixel in the plurality of surrounding pixels, the calculating being performed for each of the surrounding pixels;
converting a pixel value of the surrounding pixel in accordance with the calculated absolute value, the converting being performed for each of the plurality of surrounding pixels; and
performing smoothing processing for the pixel of interest by using the plurality of surrounding pixels including the surrounding pixel whose pixel value is converted,
wherein the converting performs a combination of a pixel value of the pixel of interest and the pixel value of the surrounding pixel, so that as the calculated absolute value increases, a weight of the pixel of interest increases.

13. A non-transitory computer readable storage medium storing a program for causing a computer to perform an image processing method, the method comprising the steps of:
calculating, in a pixel block including a pixel of interest and a plurality of surrounding pixels, an absolute value of a difference in pixel value between the pixel of interest and a surrounding pixel in the plurality of surrounding pixels, the calculating being performed for each of the plurality of surrounding pixels;
converting a pixel value of the surrounding pixel in accordance with the calculated absolute value, the converting being performed for each of the plurality of surrounding pixels; and
performing smoothing processing for the pixel of interest by using the plurality of surrounding pixels including the surrounding pixel whose pixel value is converted,
wherein the converting performs a combination of a pixel value of the pixel of interest and the pixel value of the surrounding pixel, so that as the calculated absolute value increases, a weight of the pixel of interest increases.

* * * * *